Figure 1:
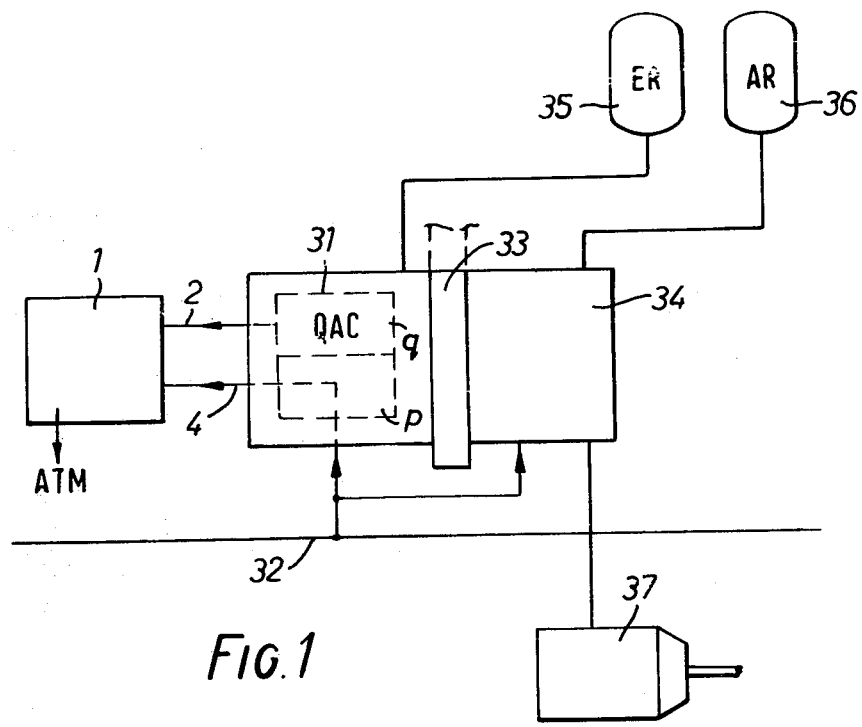

United States Patent [19]

Wickham

[11] 4,199,198
[45] Apr. 22, 1980

[54] VEHICLE BRAKING CONTROL APPARATUS

[75] Inventor: David J. Wickham, London, England

[73] Assignee: Westinghouse Brake and Signal Co. Ltd., London, England

[21] Appl. No.: 892,970

[22] Filed: Apr. 3, 1978

[30] Foreign Application Priority Data

Apr. 6, 1977 [GB] United Kingdom ............... 14471/77

[51] Int. Cl.² .............................................. B60T 15/52
[52] U.S. Cl. ....................................... 303/36; 303/81; 303/82
[58] Field of Search ....................... 303/81, 86, 82, 36, 303/69

[56] References Cited

U.S. PATENT DOCUMENTS

| 1,910,544 | 5/1933 | Hewitt | 303/36 |
| 3,707,314 | 12/1972 | Paginton | 303/36 |

Primary Examiner—Charles E. Frankfort
Assistant Examiner—Reinhard J. Eisenzopf
Attorney, Agent, or Firm—Larson, Taylor and Hinds

[57] ABSTRACT

A quick service valve is proposed for providing continuous quick service in connection with the operation of a direct release triple valve preferably also provided with an emergency portion having a sensitivity valve for providing a bleed of fluid pressure from a quick action chamber to follow the pressure reductions in a brake pipe, the apparatus having a reference pressure input path connected to the quick service chamber, a brake pipe pressure signal input path, a pressure responsive member responsive to a predetermined difference between the brake pipe pressure and the reference pressure to operate a valve to initiate a restricted discharge from the brake pipe to cause a reduction of the reference pressure and consequent reclosure of the valve. The operation is repetitive during continuing reduction of brake pipe pressure at sufficient rate.

6 Claims, 2 Drawing Figures

VEHICLE BRAKING CONTROL APPARATUS

This invention relates to vehicle braking control apparatus and relates especially to control apparatus which operates to control the application of fluid pressure to a brake cylinder in response to a reduction of fluid pressure in a brake pipe in relation to the fluid pressure in a reference chamber.

In the specification of U.S. Pat. No. 3,707,314, there is described a fluid operable brake control triple valve apparatus having a brake cylinder port for the supply of fluid pressure into and out of a brake cylinder, the valve being operable by a pressure responsive member movable in response to pressure applied to a brake pipe, a quick service bulb inlet valve via which the brake pipe is connectable to a quick service bulb capacity, a bulb exhaust valve via which the quick service bulb capacity is ventable, the bulb inlet and exhaust valves being operable by the member, the bulb inlet valve being opened to effect a discharge of brake pipe pressure into the bulb capacity during movement of the member in response to a reduction of brake pipe pressure to initiate a brake application. This quick service facility does however have a short-coming in that following a brake application and when a partial brake application exists, the quick service bulb capacity is connected directly to the brake pipe and for continuing reductions of brake pipe pressure giving rise to further increases of pressure applied to the brake cylinder, no quick service facility exists.

According to the present invention there is provided apparatus for improved quick service operation of a vehicle braking system employing direct release triple valves and having a quick action chamber and sensitivity valve means operable for normal service braking operation to bleed fluid pressure from said quick action chamber to follow brake pipe pressure reductions, the apparatus having a reference pressure input path connected to said quick action chamber and a brake pipe pressure signal input path, a pressure responsive member responsive to a predetermined difference between a control pressure (derived from the brake pipe) and the pressure at the reference pressure input port to operate a valve to initiate a restricted flow discharge of fluid pressure from the brake pipe pressure input path to cause a reduction of the reference pressure and re-closure of said valve, the operation being repetitive during a reduction of the brake pipe pressure at a sufficient rate.

The apparatus may preferably include a quick service volume for receiving said discharge of fluid pressure, said volume having a further restricted flow path for discharging thereof during periods when said valve is closed.

Figure 2:
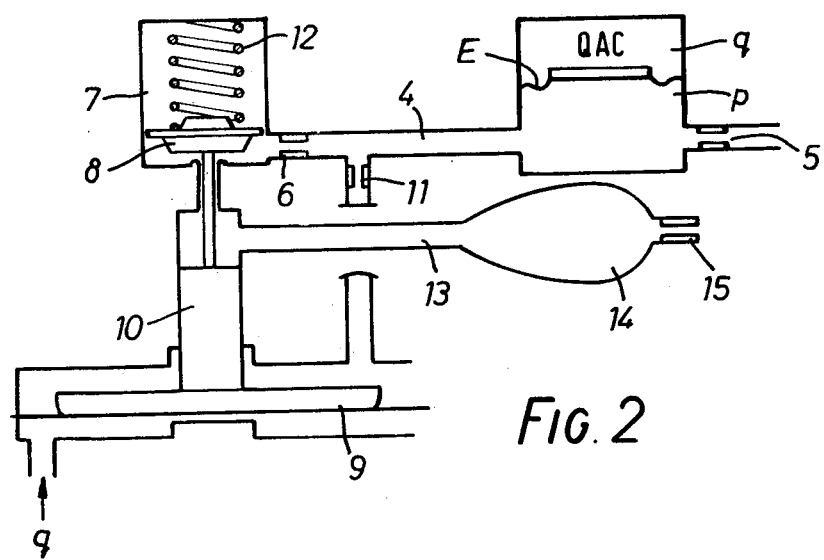

In order that the invention may be more clearly understood and readily carried into effect, the same will be further described by way of example, with reference to the accompanying drawings, of which FIG. 1, illustrates in diagrammatical form a brake control valve apparatus to which the present invention is especially intended to be applied, and FIG. 2, illustrates a valve apparatus for improved quick service operation in accordance with one embodiment of the invention.

A typical emergency valve portion for use in conjunction with a triple valve of the general type referred to above with reference to the specification of U.S. Pat. No. 3,707,314, is described in some detail in the specification of U.S. Pat. No. 4,025,125. In its essentials, the apparatus described therein comprises a pressure responsive member separating a chamber at brake pipe pressure from a chamber at a quick action chamber reference pressure. These two chambers are ordinarily maintained at equal pressures and the pressure responsive member is responsive only to at least a predetermined change of brake pipe pressure in a given time to open a brake cylinder valve to provide a communication between a fluid pressure reservoir and a brake cylinder and to open a vent valve which is effective to vent the brake pipe to thereby effect an emergency brake operation. It will be appreciated moreover that the rate of change of brake pipe pressure in relation to the quick action chamber pressure, to effect such an emergency operation, is substantially greater than the rate of change which normally is effected to operate the associated service triple valve to produce a normal service braking operation.

The apparatus 1 in accordance with the present invention, is assumed to be mounted alongside an emergency portion of fluid operable brake control valve apparatus such as described in the aforementioned specification and as illustrated in diagrammatical form at 31, 33, 34 in FIG. 1. The reference pressure signal input path 2 is connected to receive a signal q from the quick action chamber (QAC) of the emergency portion 31 and the brake pipe pressure signal input path 4 being connected to receive a signal p from the brake pipe 32.

The pipe bracket upon which the emergency portion is mounted is represented by reference 33 and this also carries a triple valve 34 as the service portion of the control valve apparatus. Emergency and auxiliary reservoirs 35 and 36 are shown connected to the emergency and service portions and the output of the service portion, which in the event of an emergency valve operation is also supplemented by emergency reservoir air, is applied to a brake cylinder represented by reference 37. It will be appreciated from the said specification that for a normal service application, the emergency portion provides a path via which the quick action chamber pressure is enabled to follow reductions of brake pipe pressure. Only when the brake pipe pressure falls at more than a prescribed rate is the emergency portion operated to effect rapid venting of the brake pipe and connection of the emergency reservoir to the brake cylinders to supplement a full service application.

The emergency valve portion 31 includes a suitably dimensioned sensitivity valve by means of which in the case of a rate of fall of brake pipe pressure in relation to quick action chamber pressure of less than (say) 7 p.s.i. per minute, the quick action chamber is discharged in a controlled manner down towards the brake pipe pressure and stabilizes thereat when the brake pipe pressure becomes steady. This is the state of affairs during the making and establishment of a service brake application under the control of the service triple valve portion mentioned above.

Referring to FIG. 2, this shows in diagrammatical form the continuous quick service feature represented by reference 1 in FIG. 1, together with the chambers p, q on either side of the controlling member (E) of the emergency portion. It will be seen that the brake pipe 32 is connected to chamber p via a restricted path through a restriction 5 and p is connected by path 4 which a further restriction 6 to a normally closed valve 7, also referred to as a further valve, with a closure member 8 operable by a pressure responsive member having a sealingly slideable control stem 10. One side of 9 is in communication with passage 4 via a third restriction 11 and the other side communicates with the quick action chamber q of the emergency portion, the pressure in which also acts thereby as the reference pressure for the control of further valve 7. Valve 7 is permanently biassed by a light spring which overcomes any effect of the area of stem 10 with equalised pressures across 9. The output side of valve 7 is connected via a passage 13 to a quick service bulb 14 with a passage to atmosphere via a fourth restriction 15.

In operation of the apparatus, a service application alone occurs where the rate of reduction of brake pipe pressure falls at no more than about 7 p.s.i. per minute towards a value corresponding to a desired magnitude of a brake application. In such circumstances, there is a reduction of pressure in p via restriction 5 and therefore above 9 via restriction 11. Assuming the stability of valve member 8 is overcome, this is unseated by the resultant force exerted by 9 and a restricted discharge therefore occurs from p into 14. This discharge results in a reduction of pressure in p and by movement of E, the operation of the sensitivity valve of the emergency portion to effect a controlled reduction of the pressure in q. This in turn results in a reduction of the pressure below 9 to a value below that at which 8 recloses. After reclosure of 8, bulb 14 continues to discharge towards atmosphere via 15 and during any continued reduction of brake pipe pressure, cycles of operation are repetitive, discharging bursts of air into the bulb capacity 14.

It will be seen that by the suitable choice of restrictions 5, 6, 11 and 15, and with other than steady pressure conditions, the pressure above the member 9 tends to stand at a pressure which lies slightly below brake pipe pressure. As a consequence, the controlled fall of the pressure in q is able to result in a reclosure of valve 8 as described. The result is therefore that the pressure responsive member 9, controlling valve 8 co-operates with the action of pressure-responsive member E and the sensitivity valve of the emergency portion. This results in chopped discharge of pressure from the brake pipe as described.

It is a characteristic of conventional quick service principles that they employ a quick service bulb which on the first reduction of brake pipe pressure to effect operation of the service triple valve connect the bulb to the brake pipe once and for all until a subsequent brake release. This action of the present apparatus is initiated for the first and subsequent reductions of brake pipe pressure from the fully released condition of the brakes so that it is operable to provide a quick service facility which is continuous in the sense that it is not limited to the first such brake pipe reduction.

Having thus described our invention, what we claim is:

1. Apparatus for improved quick service operation of a vehicle braking system employing direct release triple valves and having a quick action chamber and sensitivity valve means operable for normal service braking operation to bleed fluid pressure from said quick action chamber to follow brake pipe pressure reductions, the apparatus having a reference pressure input path connected to said quick action chamber and a brake pipe pressure signal input path, a pressure responsive member responsive to a predetermined difference between a control pressure and the pressure at the reference pressure input port to operate a further valve to initiate a reduction below brake pipe pressure of the fluid pressure in the brake pipe pressure signal input path to cause said sensitivity valve means to effect a reduction of the reference pressure and reclosure of said further valve, the operation being repetitive during a reduction of the brake pipe pressure at a sufficient rate.

2. Apparatus as claimed in claim 1, the said sensitivity valve being responsive in operation to the pressure in the brake pipe pressure signal input path, said path being connected via a first restriction to the brake pipe, via a second restriction to the control pressure area of the pressure responsive member.

3. Apparatus as claimed in claim 2, wherein discharge is provided from said path via said further valve via a further restriction.

4. Apparatus as claimed in claim 1, 2 or 3, wherein discharge is provided via said further valve into a quick service volume connected via a restriction to atmosphere.

5. Apparatus as claimed in claim 4, wherein said further valve is spring biassed towards a stable, closed position.

6. Apparatus as claimed in claim 1 included in a rail vehicle braking system.

* * * * *